Sept. 18, 1934.   McCONNELL SHANK   1,974,219
METHOD OF MAKING PLASTIC ARTICLES
Filed March 29, 1934   2 Sheets-Sheet 2
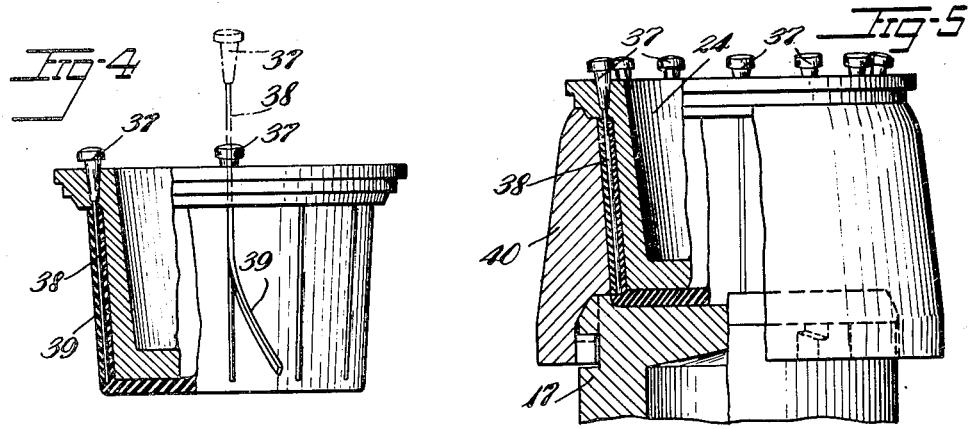
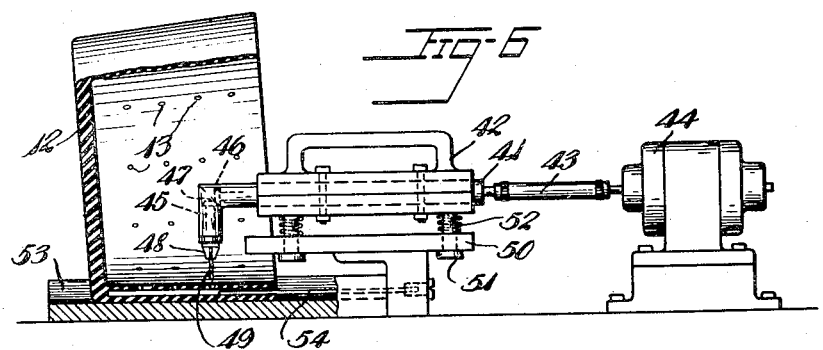
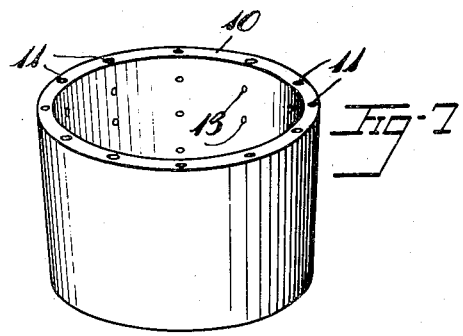
Inventor
M<sup>c</sup>Connell Shank
By Eakin & Avery
Attys.

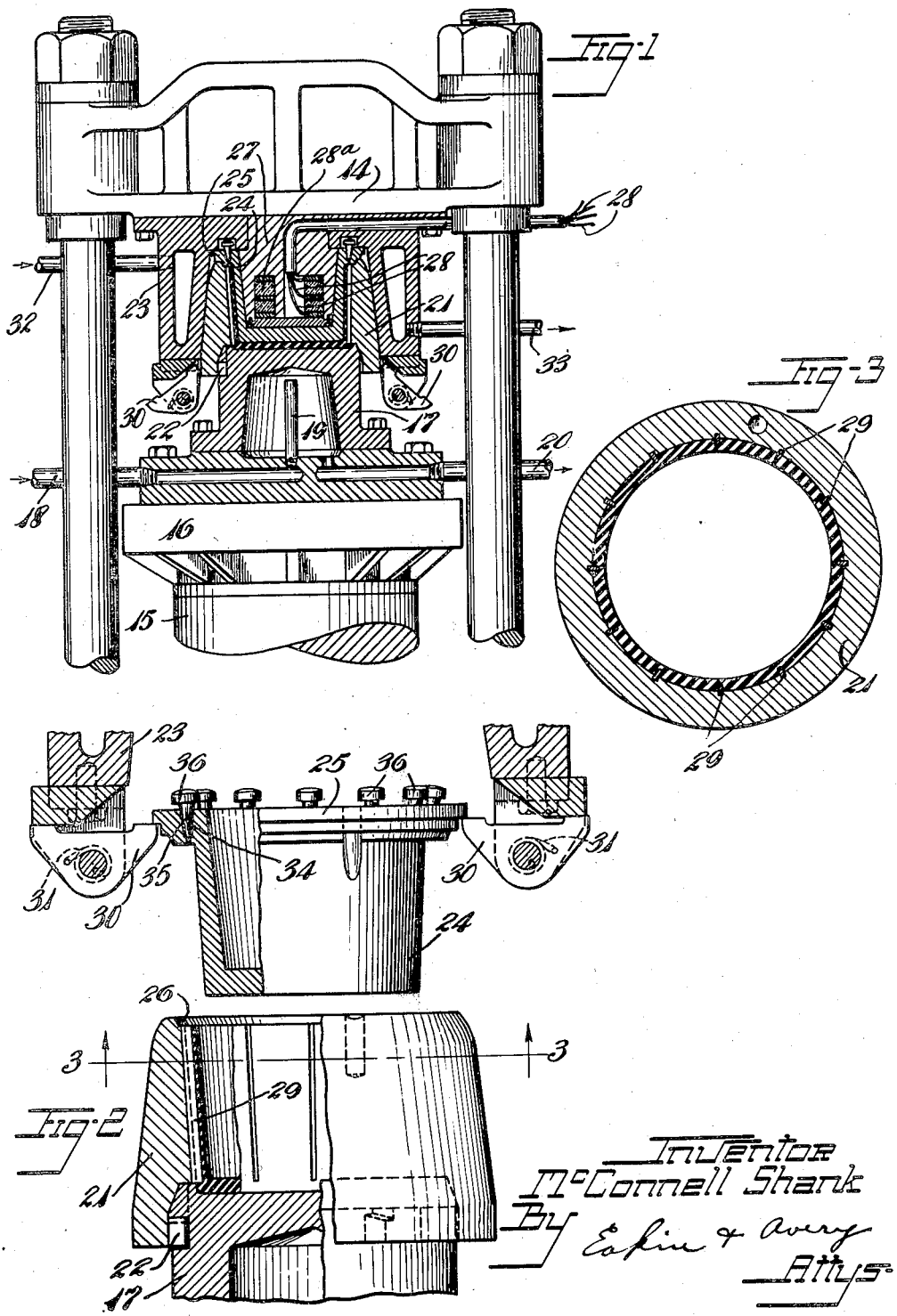

Patented Sept. 18, 1934

1,974,219

UNITED STATES PATENT OFFICE 1,974,219

METHOD OF MAKING PLASTIC ARTICLES

McConnell Shank, Akron, Ohio, assignor to The B. F. Goodrich Company, New York, N. Y., a corporation of New York Application March 29, 1934, Serial No. 717,960

4 Claims. (Cl. 18—47.5)

This invention relates to the manufacture of articles from plastic materials, and is especially related to the manufacture of hollow vessels having narrow cored openings extending through and along their walls.

The principal objects of the invention are to provide accuracy and facility of manufacture and to provide a superior article at a substantial saving in cost.

Other objects will appear from the following description and the accompanying drawings.

In the drawings:

Fig. 1 is a vertical sectional view of a molding press of a type preferred for use in carrying out the invention, showing the article in place in the mold during the first molding operation, parts of the press being broken away.

Fig. 2 is an enlarged detail view of the mold parts and the article after the first molding operation, the core having been withdrawn.

Fig. 3 is a section on line 3—3 of Fig. 2.

Fig. 4 is a side elevation of the article and its main core after the first molding operation, the placing of the ancilliary cores and the filling strips being shown, the view being partly in section.

Fig. 5 is an elevation, partly in section, of the article the cores and the mold assembled in proper relation for the second molding operation.

Fig. 6 is an elevation of a preferred form of drilling apparatus showing the article in position to be drilled and partly in section.

Fig. 7 is a perspective view of the finished article.

The vessel chosen to illustrate the invention is a hard rubber spinning bowl used in the viscose industry. The article is shown in Fig. 7 and as shown is of frusto-conical shape and open at the larger end. The side walls 10 are formed with passages 11, extending parallel to the walls and open at the rim. The passages 11 are equally spaced and extend only to the solid bottom 12. A plurality of apertures 13 communicate between the passages 11 and the interior of the bowl.

In order to accurately mold the article with the passages 11, I provide a set of molds which are mounted in a hydraulic press. The press comprises a fixed platen 14 supported from a base (not shown) which also is formed to provide a pressure cylinder. A ram 15, mounted in the cylinder, carries a movable platen 16. A bottom molding member 17 is fastened to the lower platen. It is heated by steam and for this purpose is made hollow. An inlet pipe 18 admits steam to a pipe 19 projecting into the cavity in the member, and an outlet pipe 20 is provided to drain the condensed steam. Suitable flexible connections are provided for pipes 18 and 20, to permit raising and lowering the platen.

A ring shaped mold member 21 is counterbored at its lower end, as at 22, to provide a bayonet joint connection to mold member 17. Its outer face is conically tapered to fit a mold case 23, suspended from the fixed platen. A hollow core member 24 has a flanged rim 25, adapted to mate with a counterbore 26 in the upper face of ring 21. The core member 24 cooperates with the ring member 21 and the lower member 17 to define a cavity of the desired shape.

A core-heating member 27 is attached to the fixed platen within the mold case 23, and is heated, preferably by electricity, wires 28 being provided for the purpose of conducting electricity to the heating coils 29 mounted therein.

According to this invention, I propose to mold the article so as to form axial grooves corresponding in extent with the passageways 11, and of sufficient depth that the tops of the grooves may be subsequently filled, leaving the passageways. For this purpose the ring 21 is provided with a plurality of inwardly projecting ribs 29 which extend radially therefrom a distance necessary to form the proper thickness of wall between the apertures 11 and the inner surface of the bowl.

As a means for stripping the core member 24 from the finished article, a pair of spring actuated latches 30 are pivotally mounted on the lower face of the mold case 23. Coil springs 31 normally hold the latches in the position shown in Fig. 2 where they engage the flanged rim of the core member against downward movement. In closing the mold, the latches are turned on their pivots to the position shown in Fig. 1 by contact with the tapered sides of the ring 21.

Mold case 23 is heated by steam and an inlet pipe 32, and an outlet pipe 33 are provided for this purpose.

In the manufacture of the article, a quantity of plastic material, such as unvulcanized hard rubber composition is placed between the mold members within the ring 21. The mold members have been heated by the application of steam or other heating medium. The press is closed forcing the plastic material to fill the cavity provided between the mold members.

Sufficient vulcanization of the rubber composition is permitted to take place, while the article is in the mold, to cause it to retain its shape when it is removed from the mold. This partial vulcanization is accomplished by the application of heat.

After the first molding operation is complete, cores for defining the passages 11 are placed in the grooves formed by the ribs 29 and other plastic material is applied over the cores to fill the grooves. In order to accomplish this step, the core member 24 has a number of tapered apertures 34 through its flange 25. These apertures correspond in number and location to the ribs 29 of the ring 21. Tapered plugs 35, having enlarged heads 36, by which they may be withdrawn, are provided to fill the apertures 34 during the first molding operation. A similar set of plugs 37, but having cores 38 extending therefrom, are provided, to replace plugs 35 during the second molding operation.

The article produced from the first molding operation is replaced on the core member 24, as shown in Fig. 4. Plugs 37 are now inserted in apertures 34 and their cores 38 will lie in the grooves of the article. Unvulcanized strips of rubber composition 39 of the same dimensions as the unfilled portion of the grooves are now placed in the grooves. The article may now be replaced in the mold for the second molding operation. Before this is done, however, a ring 40, similar to the mold ring 21 but not having the ribs 29, is substituted for the ring 21. The mold is now closed with the article therein and vulcanization completed. The rubber strips 39 become integral with the body of the article during vulcanization.

After vulcanization is complete the mold is opened, cores 38 are withdrawn, and the article is removed from core member 24.

Apertures 13 are provided by drilling the hard rubber with a twist drill. They must be properly aligned with the passages 11 which they must accurately intersect. To accomplish the drilling the following apparatus is used: A drive shaft 41 is horizontally journaled in a drilling head 42 and is driven through a flexible shaft 43, by an electric motor 44. A short drill spindle 45 journaled vertically in the drill head, is connected by bevel gears 46, 47, to shaft 41 and is provided with a drill chuck 48 for holding the drill 49. Drill head 42 is supported by a frame member 50 but may move vertically with relation thereto. Guide pins 51 attached to the drill head 42 extend through apertures in the frame 50. Springs 52, surrounding pins 51 normally hold the drill head in elevated position. A V-block 53 extends under the drill and is attached to frame 50. A locating rod 54 is also attached to frame 50 and extends over the V-block to a point just short of the drill 49. Drill 49, rod 54 and V-block 53 are aligned in a vertical plane with respect to each other. When the hard rubber bowl is laid on its side in the V-block and one of its passages 11 encompasses the rod 54, the drill head 42 may be pressed downwardly causing the drill to form a radial aperture in the bowl. The remaining apertures are drilled in the same manner.

I claim:

1. The method of making, from plastic material, a thin-walled article having passages extending through its walls substantially parallel thereto, which comprises molding the article with grooves corresponding in location to the desired passages and open on the face of one of its walls, placing removable cores in the grooves, filling the remainder of the grooves with plastic, remolding the article, and withdrawing the cores.

2. The method of making, from plastic material, a thin-walled article having passages extending through its walls substantially parallel thereto, which comprises molding and semi-vulcanizing the article with grooves corresponding in location to the desired passages and open on the face of one of its walls, placing removable cores in the grooves, placing strips of unvulcanized rubber composition in the grooves and over the cores, remolding the article while completing vulcanization, and withdrawing the cores.

3. The method of making, from plastic material, a thin-walled article having passages extending through its walls substantially parallel thereto, which comprises molding the article with grooves corresponding in location to the desired passages and open on the face of one of its walls, placing removable cores in said grooves, filling the remaining space of the grooves with similar plastic material, remolding the article, removing the cores, and drilling apertures through a face of the article to communicate with the passages so formed.

4. The method of making, from plastic material, a thin-walled hollow bowl having passages extending from its rim through its walls and communicating with its interior, which comprises molding the article with grooves corresponding to the desired passages and open on the face of its walls, placing removable cores in said grooves, filling the remaining space in the grooves with similar plastic material, molding the bowl, removing the cores, and drilling apertures through the inner face of the bowl to communicate with said passages.

McCONNELL SHANK.